United States Patent
Saito

(10) Patent No.: US 9,566,514 B2
(45) Date of Patent: Feb. 14, 2017

(54) GAME PROVIDING SYSTEM

(71) Applicant: Sony Computer Entertainment Inc., Tokyo (JP)

(72) Inventor: Hideyuki Saito, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/663,642

(22) Filed: Mar. 20, 2015

(65) Prior Publication Data

US 2015/0273329 A1 Oct. 1, 2015

(30) Foreign Application Priority Data

Apr. 1, 2014 (JP) ................................. 2014-075604

(51) Int. Cl.
*A63F 9/24* (2006.01)
*A63F 13/355* (2014.01)
*A63F 13/35* (2014.01)
*A63F 13/30* (2014.01)

(52) U.S. Cl.
CPC ............ *A63F 13/355* (2014.09); *A63F 13/30* (2014.09); *A63F 13/35* (2014.09); *A63F 2300/534* (2013.01)

(58) Field of Classification Search
None
See application file for complete search history.

(56) References Cited

U.S. PATENT DOCUMENTS

| | | | |
|---|---|---|---|
| 6,015,348 A * | 1/2000 | Lambright et al. | 463/42 |
| 6,146,275 A * | 11/2000 | Asai et al. | 463/31 |
| 6,659,861 B1 * | 12/2003 | Faris et al. | 463/1 |
| 8,151,199 B2 * | 4/2012 | Gerson et al. | 715/757 |
| 8,339,679 B2 | 12/2012 | Tsujii | |
| 8,379,013 B2 * | 2/2013 | Woo et al. | 345/419 |
| 8,435,121 B1 | 5/2013 | Fisher | |

(Continued)

FOREIGN PATENT DOCUMENTS

| | | |
|---|---|---|
| JP | 2000042247 A | 2/2000 |
| JP | 2005519382 | 6/2005 |

(Continued)

OTHER PUBLICATIONS

Office Action for corresponding JP Patent No. 2014-075606, 9 pages, dated Mar. 22, 2016.

(Continued)

*Primary Examiner* — Paul A D'Agostino
(74) *Attorney, Agent, or Firm* — Matthew B. Dernier, Esq.

(57) ABSTRACT

Disclosed herein is a game providing system, including: an allocation server connected to a plurality of client apparatus through a network; and a game providing server configured to execute a game application to be provided to the client apparatus allocated by the allocation server. The game providing server is a multiprocessing system which includes a plurality of game processing systems each of which can solely execute at most one game application. The allocation server sets the number of ones of the game processing systems which are to be allocated in order to execute one game application in the game providing server in response to a load to the game providing server.

11 Claims, 8 Drawing Sheets

(56) References Cited

U.S. PATENT DOCUMENTS

| | | |
|---|---|---|
| 8,582,033 B2 | 11/2013 | Sawada |
| 9,117,285 B2 | 8/2015 | Clemie |
| 9,348,742 B1* | 5/2016 | Brezinski ............ G06F 12/0223 |
| 2006/0072831 A1 | 4/2006 | Pallister |
| 2007/0004501 A1* | 1/2007 | Brewer et al. .................. 463/25 |
| 2007/0294387 A1* | 12/2007 | Martin .................... H04L 29/06 709/224 |
| 2008/0293494 A1* | 11/2008 | Adiraju et al. ................. 463/42 |
| 2010/0046036 A1 | 2/2010 | Tsujii |
| 2010/0057898 A1* | 3/2010 | Imai ...................... G06F 9/5072 709/223 |
| 2010/0105454 A1* | 4/2010 | Weber et al. ...................... 463/1 |
| 2010/0317364 A1* | 12/2010 | Zhang .................. H04W 16/04 455/452.2 |
| 2011/0212783 A1* | 9/2011 | Dale et al. ...................... 463/42 |
| 2012/0050614 A1 | 3/2012 | Sawada |
| 2012/0149464 A1 | 6/2012 | Bone |
| 2012/0190458 A1* | 7/2012 | Gerson et al. .................. 463/42 |
| 2013/0035158 A1* | 2/2013 | Osvald et al. ................. 463/30 |
| 2013/0344965 A1* | 12/2013 | Dale et al. ..................... 463/42 |
| 2014/0004947 A1* | 1/2014 | Yamaguchi et al. ........... 463/31 |
| 2014/0101226 A1* | 4/2014 | Khandekar ......... H04L 67/1008 709/203 |
| 2014/0111529 A1 | 4/2014 | Clemie |
| 2014/0171204 A1* | 6/2014 | Cox et al. ...................... 463/42 |
| 2015/0105156 A1* | 4/2015 | Gault et al. .................... 463/31 |
| 2015/0133216 A1* | 5/2015 | Heinz et al. ................... 463/31 |
| 2015/0196841 A1* | 7/2015 | Lee ....................... A63F 13/355 463/42 |

FOREIGN PATENT DOCUMENTS

| | | |
|---|---|---|
| JP | 2010050932 A | 3/2010 |
| WO | 03075116 A2 | 9/2003 |
| WO | 2010134482 A1 | 11/2010 |

OTHER PUBLICATIONS

Roadmap Check-Reform of cloud computing which NVIDIA aspires for, Nikkei WinPC, vol. 18, No. 11, Nikkei Business Publications, Inc., 3 pages, dated Jun. 29, 2012. (for relevancy see Office Action for corresponding JP Patent No. 2014-075606, 9 pages, dated Mar. 22, 2016).

Office Action for related U.S. Appl. No. 14/663,669, 8 pages, dated Dec. 18, 2015.

\* cited by examiner

FIG. 8A
FIG. 8B
FIG. 8C
FIG. 8D
FIG. 8E

GAME PROVIDING SYSTEM

BACKGROUND

The present technology relates to a game providing system.

In recent years, communication technologies for networks beginning with the Internet have developed rapidly, and what is called a cloud service by which a user receives the provision of various applications through a network has become provided. Among such cloud services, also a cloud gaming service has been implemented wherein a game application is executed on a cloud server and a result of the execution is streaming distributed to a client apparatus through a network.

In order to implement such a cloud gaming service as just described, a plurality of game providing servers are required to provide different applications to a plurality of different users. Naturally, a plurality of processing systems are involved in order to execute game applications.

If a plurality of processing systems are prepared in order to cope with a maximum number of users estimated as users who utilize a cloud gaming service, then when the number of users who actually utilize the cloud gaming service is small, a surplus appears among calculation resources of the game providing server. On the other hand, if the number of processing systems to be prepared is reduced, then the calculation resources of the game providing server become insufficient, and the game providing servers cannot cope with an estimated maximum number of users.

Therefore, it is desirable to provide a technology which can distribute calculation resources of a game providing server appropriately.

SUMMARY

In order to solve the problem described above, according to an embodiment of the present technology, there is provided a game providing system including an allocation server connected to a plurality of client apparatus through a network, and a game providing server configured to execute a game application to be provided to the client apparatus allocated by the allocation server. The game providing server is a multiprocessing system which includes a plurality of game processing systems each of which can solely execute at most one game application. The allocation server sets the number of ones of the game processing systems which are to be allocated in order to execute one game application in the game providing server in response to a load to the game providing server.

It is to be noted that an arbitrary combination of the components described above and representations of the present technology where they are converted between a method, an apparatus, a system, a computer program a data structure, a recording medium and so forth are valid as modes of the present technology. The computer program may be provided as part of firmware which is incorporated in an apparatus in order to carry out basic control of hardware resources which implements the graphics processor. This firmware is stored in a semiconductor memory such as a ROM (Read Only Memory) or a flash memory in the apparatus. In order to provide this firmware or in order to update part of the firmware, a computer-readable recording medium in or on which the program is recorded may be provided, or the program may be transmitted by a communication line.

With the present technology, a technology which can distribute calculation resources of a game providing server appropriately can be provided.

The above and other features and advantages of the present technology will become apparent from the following description and the appended claims, taken in conjunction with the accompanying drawings in which like parts or elements are denoted by like reference characters.

BRIEF DESCRIPTION OF THE DRAWINGS

FIGS. 8A to 8E are diagrammatic views illustrating a flow of updating of a memory map upon cooperation of four processing systems.

DETAILED DESCRIPTION OF THE PREFERRED EMBODIMENT

Figure 1:
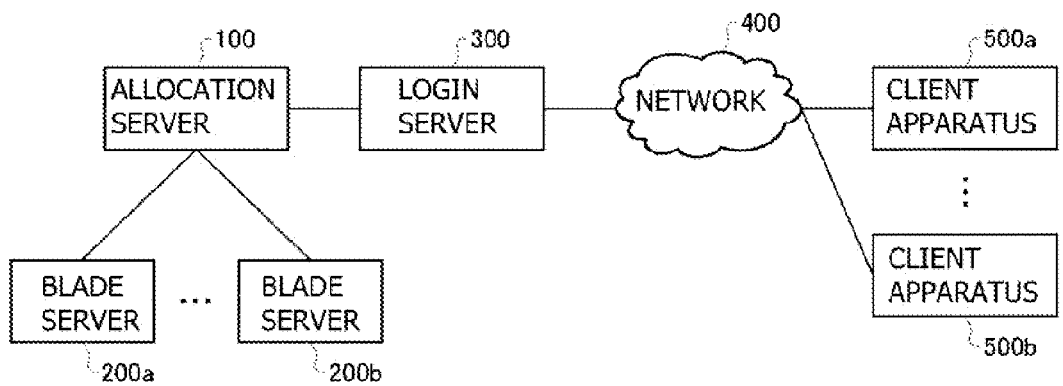
FIG. 1 is a block diagram schematically depicting a general configuration of an application providing system according to an embodiment.

FIG. 1 schematically depicts a general configuration of an application providing system 10 according to an embodiment. In FIG. 1, from among a plurality of client apparatus 500 generally referred to as client apparatus 500, client apparatuses 500a and 500b are depicted. The client apparatus 500 are connected to a login server 300 through a network 400 such as the Internet.

The login server 300 manages accounts of users who utilize the client apparatus 500 connected thereto through the network 400. The login server 300 refers to a database not depicted in which user names, passwords and so forth of users registered in the application providing system 10 are stored and is responsible for a login process and a logoff process of a user.

In FIG. 1, from among a plurality of blade servers 200 collectively referred to as blade server 200, blade servers 200a and 200b are depicted. The blade servers 200 execute an application to be provided to the client apparatus 500. An allocation server 100 allocates, from among the plural blade servers 200, a blade server 200 which is to execute an application to be provided to a client apparatus 500, and causes the blade server 200 to execute the application program. It is to be noted that details of the allocation process by the allocation server 100 are hereinafter described.

In most cases, the client apparatus 500 has a calculation resource such as a CPU (Central Processing Unit), and also it is possible to execute at least part of an application program in a local environment of the client apparatus 500. However, to a user who utilizes the client apparatus 500, it is not a significant matter whether an application is executed in a local calculation resource or in a calculation resource of the application providing system 10 on a network, but the two cases are same in that the service can be utilized. The client apparatus 500 can be implemented using, for example, a PC (Personal Computer), a stationary game console, portable game player, a smartphone, a tablet PC, a phablet, an electronic book terminal, an electronic dictionary, a portable music player or a portable one-segment television set.

FIG. 1 illustrates a manner in which the client apparatus 500 and the login server 300 are connected to each other through the network 400 and schematically depicts a real system configuration. However, a user who utilizes the client apparatus 500 does not very often recognize a system configuration of the login server 300, allocation server 100 and so forth including the network 400. From the standpoint of a user who utilizes the application providing system 10, there is no necessity to understand a physical configuration, a software configuration and so forth of the application providing system 10 when the user receives provision of a service, but the user has an impression as if the user utilized a service appearing from within a cloud of a network. The application providing system 10 depicted in FIG. 1 configures a cloud gaming system.

In the following, description is given of a case in which the blade server 200 in the application providing system 10 according to the embodiment executes a game content developed under the assumption that the game content is executed on a game console which is hardware for exclusive use. In this sense, the blade server 200 functions as a game providing server. However, the content to be executed by the blade server 200 is not limited to a game, but also execution of a content of a genre other than a game such as, for example, an SNS (Social Networking Service) or a video browsing service is included in the present embodiment.

Figure 2:
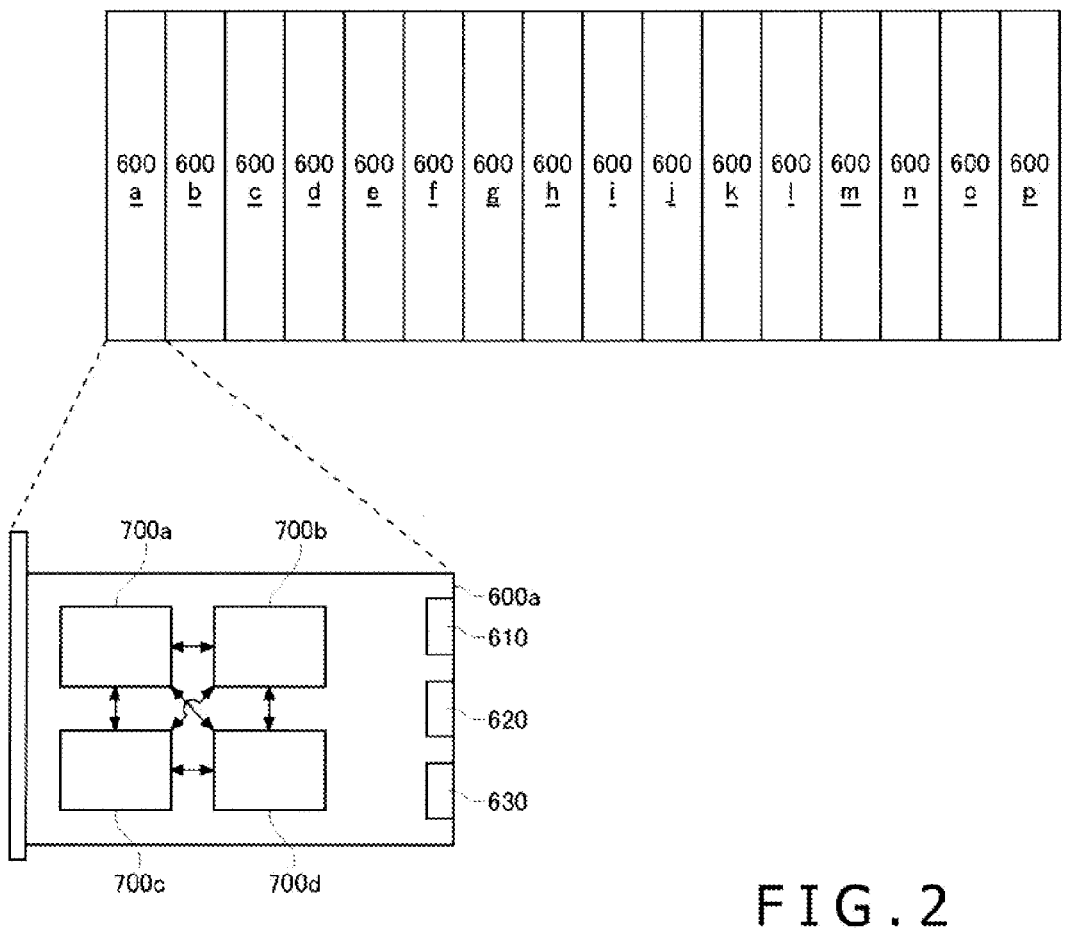
FIG. 2 is a diagrammatic view schematically depicting an internal configuration of a blade server in the embodiment.

FIG. 2 schematically depicts an internal configuration of the blade server 200 in the embodiment. Referring to FIG. 2, one blade server 200 can incorporate 16 blades 600 in a housing. The blade server 200 in the embodiment includes 16 blades 600. In FIG. 2, the 16 blades 600 are denoted as blades 600a to 600p. In the following description, except a case in which each of the blades 600a to 600p is to be specifically identified, each of the blades 600a to 600p is referred to simply as "blades 600." Each blade 600 solely configures an application providing server, and the 16 blades 600 are not necessarily required for execution of an application program. Further, the number of blades 600 provided in the blade server 200 in the embodiment is not limited to 16, but only it is necessary for a plurality of blades 600 to be provided.

As depicted in FIG. 2, one blade 600 includes four processing systems 700a to 700d (in the following description, except a case in which each of the processing systems 700a to 700d is to be specifically identified, each of the processing systems 700a to 700d is referred to simply as "processing system 700"). The blade 600 further includes a power supply port 610, an input/output port 620, and a communication port 630. The processing systems 700a to 700d, power supply port 610, input/output port 620 and communication port 630 are provided on the same board.

As described hereinabove, the blade server 200 in the embodiment executes a game content developed under the assumption that the game content is executed on a game console which is hardware for exclusive use. Each of the four processing systems 700a to 700d disposed on the substrate which configures the blade 600 is solely a processing system having a performance equivalent to that of a processing system provided in a game console.

Generally, a game title developed for a game console for exclusive use is optimized to a high degree for a hardware resource such as a processor or a memory. Therefore, one processor is occupied in order to execute one game title, and it is difficult for a processor to solely execute a plurality of game titles at the same time. Also the processing system 700 in the embodiment is a game processing system which can solely execute at most one game application. The blade 600 in the embodiment includes a plurality of such processing systems 700 and configures a multi-processing system.

The power supply port 610 supplies electric power to the processing systems 700 provided in the blade 600. The input/output port 620 is a port for transmitting and receiving data to and from a different one of the blades 600 and can be implemented using a known input/output interface such as, for example, PCI Express (Peripheral Component Interconnect Express). The communication port 630 receives an allocation instruction of a processing system 700 which is to execute a game application from the allocation server 100. The communication port 630 can be implemented using a LAN (Local Area Network) port consistent with a known LAN standard such as, for example, Ethernet (registered trademark).

Figure 3:
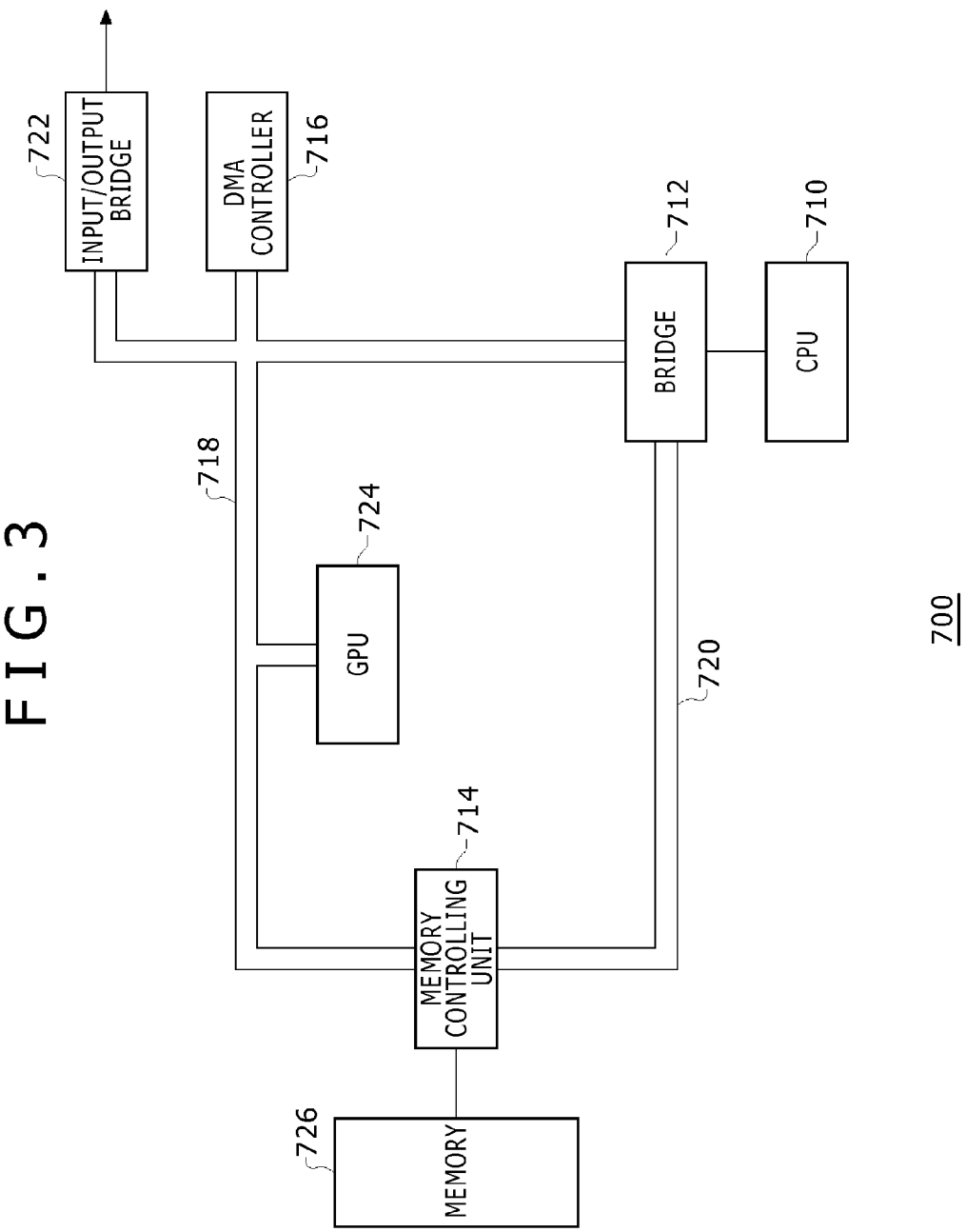
FIG. 3 is a block diagram schematically depicting a circuit configuration of a processing system in the embodiment.

FIG. 3 schematically depicts a circuit configuration of the processing system 700 in the embodiment. The processing system 700 in the embodiment includes a CPU 710, a GPU (Graphical Processing Unit) 724, a memory 726, a memory controlling unit 714, a bridge 712, a DMA (Direct Memory Access) controller 716, an input/output bridge 722, a GPU bus 718, and a CPU bus 720.

The GPU 724 generates a video of a game application to be provided to the client apparatus 500. The GPU 724 is connected to the memory 726 through the GPU bus 718. The memory 726 stores data outputted from the GPU 724.

The CPU 710 is connected to the memory 726 through the CPU bus 720. The CPU 710 is connected also to the GPU 724 through the GPU bus 718. The CPU 710 is connected to these buses through the bridge 712. Further, the memory 726 is connected to the GPU bus 718 and the CPU bus 720. Therefore, transfer of data between the memory 726 and the CPU 710 or the GPU 724 is executed through the memory controlling unit 714. The CPU 710 and the GPU 724 share the memory 726 and share data through the memory 726. Both of the GPU bus 718 and the CPU bus 720 functions as a data bus for use for data exchange.

The DMA controller 716 is connected to the GPU bus 718. The input/output bridge 722 is connected to the GPU bus 718 and serves as an interface for transferring data to and from an external processing system 700. The DMA controller 716 is connected to the GPU bus 718 and can transfer data stored in the memory 726 to the external processing system 700 under the control of the GPU 724 without intervention of the CPU 710.

Figure 4:
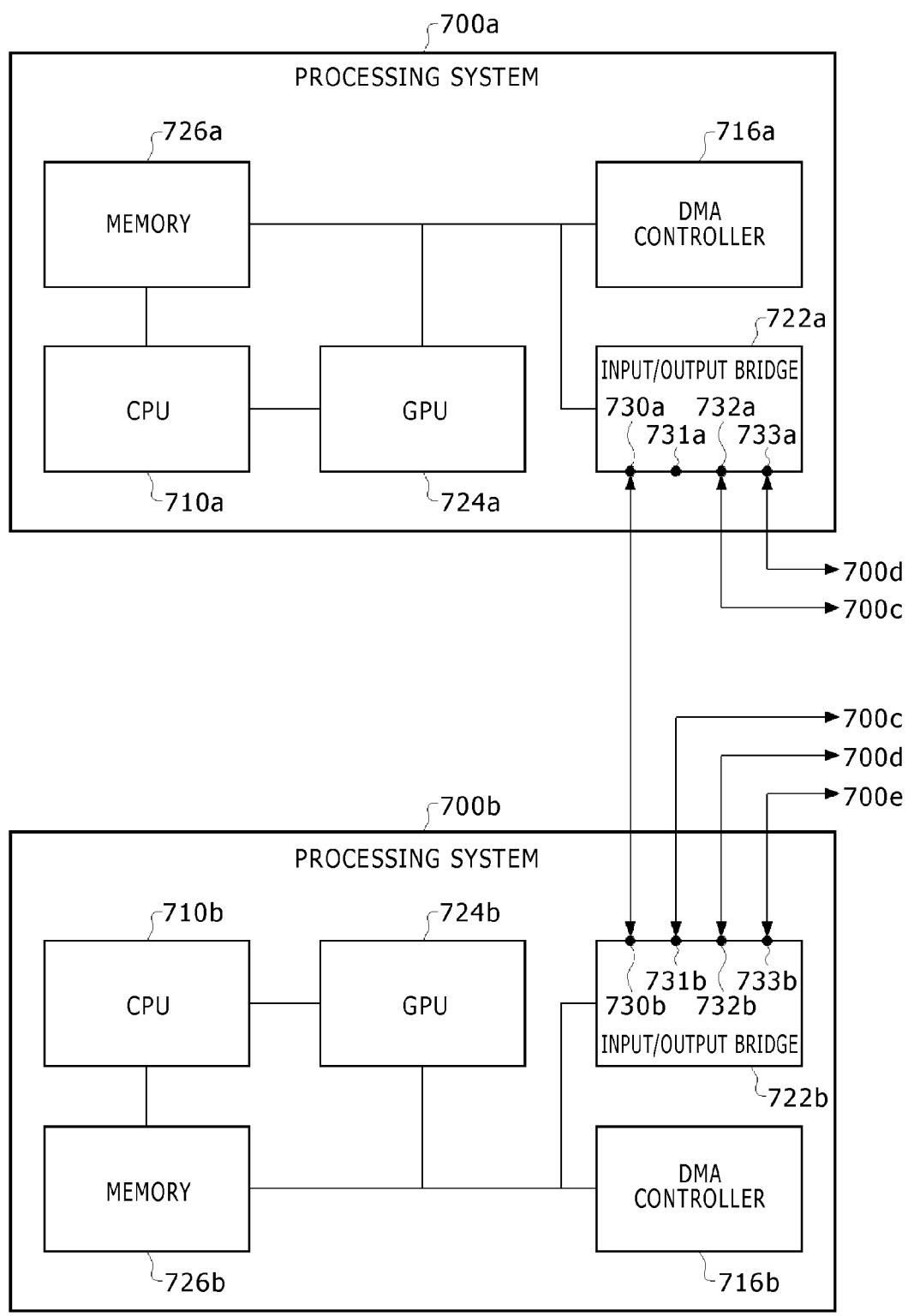
FIG. 4 is a block diagram illustrating data transfer between different processing systems.

FIG. 4 illustrates transfer of data between different processing systems 700. In the example illustrated in FIG. 4, two different processing systems 700a and 700b are connected to each other through input/output bridges 722a and 722b, respectively. More particularly, the input/output bridge 722a provided in the processing system 700a includes a plurality of input/output ports 730a, 731a, 732a and 733a for transferring data to and from the other processing system 700. Similarly, also the input/output bridge 722b provided in the processing system 700b includes a plurality of input/output ports 730b, 731b, 732b and 733b. The processing systems 700a and 700b are connected to each other through the input/output port 730a and the input/output port 730b, respectively.

Referring to FIG. 4, the processing system 700a is connected, in addition to the processing system 700b, to the processing system 700c through the input/output port 732a and is connected also to the processing system 700d through the input/output port 733a. Meanwhile, the processing system 700b is connected, in addition to the processing system 700a, to the processing systems 700c, 700d and 700e through input/output ports 731b, 732b and 733b, respectively. In this manner, the buses which connect different ones of the processing systems 700 through the input/output ports function as external buses for transferring data between the processing systems 700.

It is to be noted that the input/output bridge 722 can carry out not only accessing through the DMA controller 716 but also mapping of the input/output ports to a physical memory within a particular range to pass a command, which is to be passed to the GPU bus 718, to the GPU bus 718 of the remote node (different processing system 700). The input/output bridges 722 are connected to the GPU bus 718 and mapped to the physical memory. Therefore, each of the CPU 710 and the GPU 724 can directly access the memory 726 of the remote node.

In the following, cooperative execution of one game application program by the processing system 700a and the processing system 700b is described as an example.

In the processing system 700 in the embodiment, the GPU 724 can issue a data transfer instruction regarding data stored in the memory 726 to the DMA controller 716 without depending upon control by the CPU 710. It is assumed that, for example, the GPU 724a issues a data transfer instruction for instructing the DMA controller 716a to transfer data stored in the memory 726a to the processing system 700b. As a trigger for issuing the data transfer instruction, the GPU 724a sometimes issues a data transfer instruction voluntarily. Alternatively, the GPU 724a may issue a data transfer instruction in response to a data readout instruction broadcasted by the processing system 700b. In any case, when the DMA controller 716a receives the data transfer instruction, it controls the input/output bridge 722a to transfer data stored in the memory 726a to the processing system 700b.

The DMA controller 716b in the processing system 700b receives data transferred from the processing system 700a through the input/output bridge 722b. Then, the DMA controller 716b writes the received data into the memory 726b in the processing system 700b.

It is to be noted that, when the GPU 724b in the processing system 700b tries to acquire data stored in the memory 726a of the processing system 700a, the GPU 724b first issues a data acquisition instruction to the DMA controller 716b without intervention of the CPU 710b. After the DMA controller 716b receives the data acquisition instruction, it issues a readout instruction of data to the input/output bridge 722b. The input/output bridge 722b broadcasts the readout instruction of data issued by the DMA controller 716b to the external bus. Operation of the processing system 700a after it receives the instruction is similar to that described hereinabove.

In this manner, the GPU 724 can transmit data stored in the memory 726 to an external processing system 700 and can receive data of the external processing system 700 and store the data into the memory 726. It is to be noted that details of sharing and processing of data between a plurality of processing systems 700 are hereinafter described.

Figure 5A:
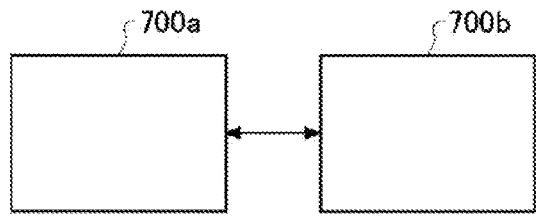
FIGS. 5A to 5C are diagrammatic views schematically illustrating connection topologies between processing systems in one blade.
Figure 5B:
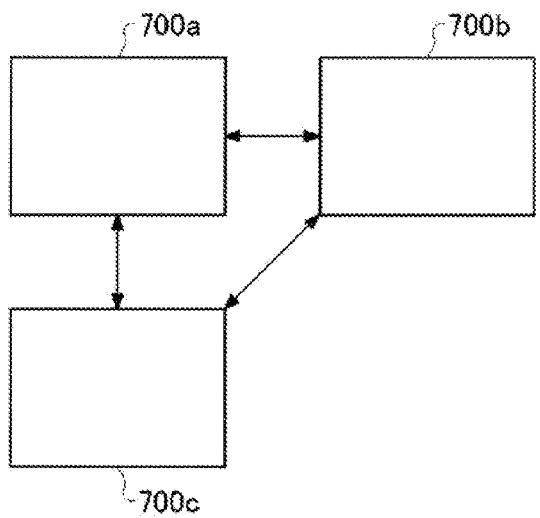
Figure 5C:
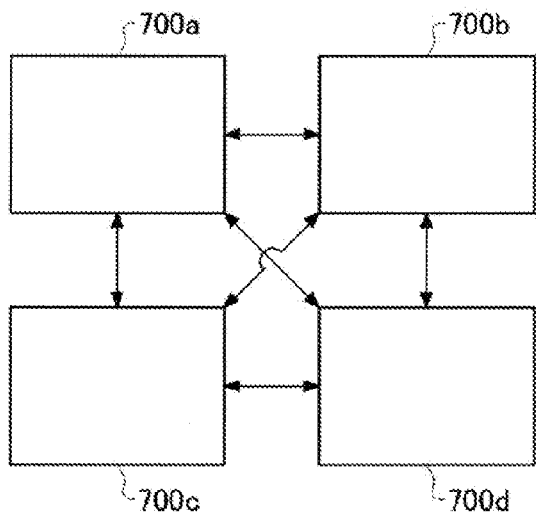

FIGS. 5A to 5C schematically illustrate connection topologies of processing systems 700 in one blade 600. As described hereinabove, the processing systems 700a to 700d having a same performance are mounted on a board which configures the blade 600. Here, it is assumed that the input/output bridges 722a to 722d in the processing systems 700 are mounted using known PCI Express.

Though not depicted, a system controller for controlling operation of PCI Express is incorporated in the blade 600. The system controller receives an instruction indicative of a connection relationship from the allocation server 100 through the communication port 630 and controls the connection of the input/output bridge 722. More particularly, the system controller sets Root Complex and Endpoint of PCI Express based on the received instruction and then applies resetting to establish connection. The processing systems 700 between which the connection is established share data stored in the memories of them and can cooperatively execute the same game application.

FIG. 5A illustrates a connection scheme of the two processing systems 700a and 700b. FIG. 5B illustrates a connection scheme of the three processing systems 700a, 700b and 700c. FIG. 5C illustrates a connection scheme of the four processing systems 700a, 700b, 700c and 700d. Since the input/output bridge 722 in each processing system 700 includes a plurality of input/output ports (730, 731, 732 and 733), in any case, different processing systems 700 are connected to each other by a point-to-point connection. Consequently, the processing systems 700 can carry out one-to-one communication therebetween.

Figure 6:
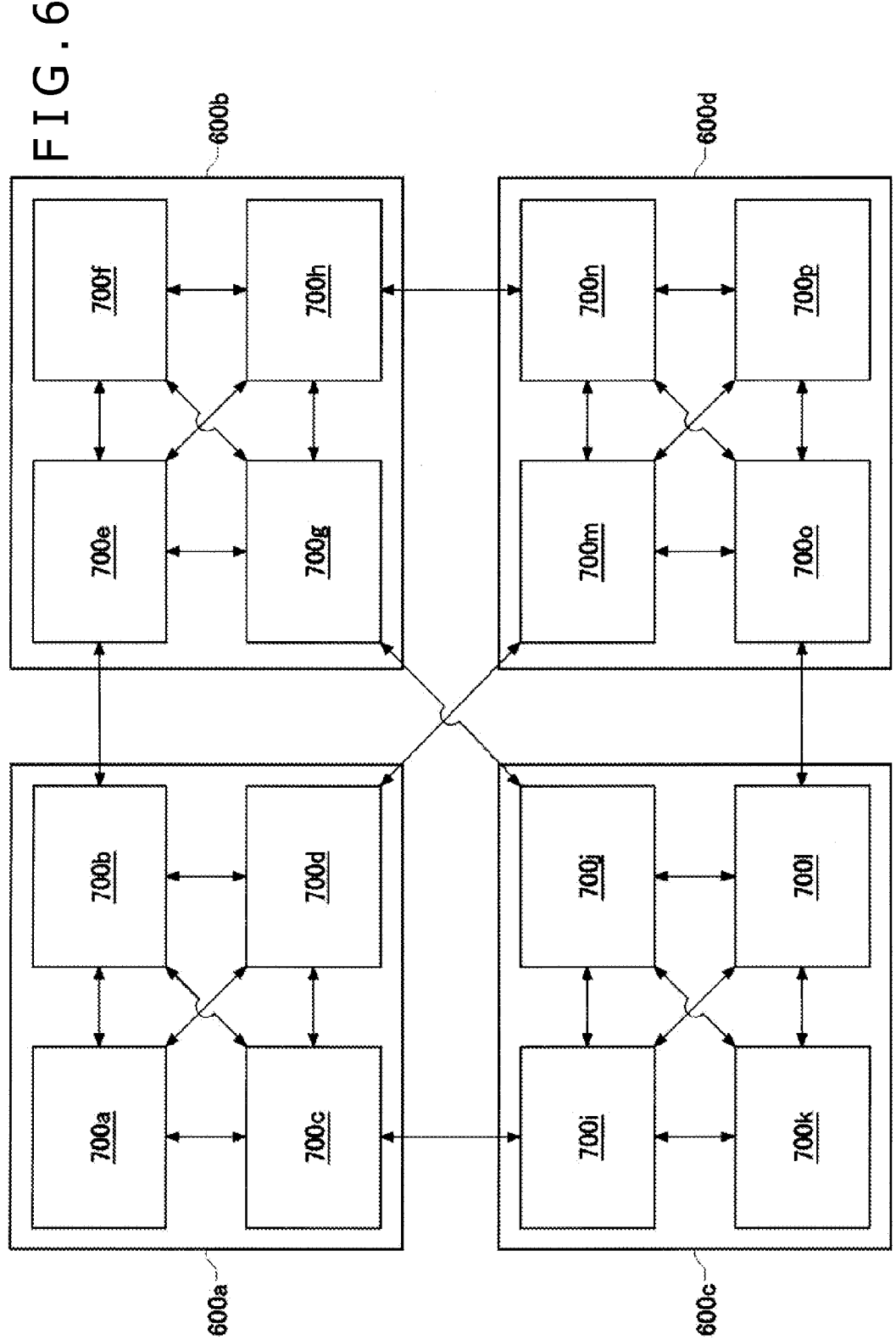
FIG. 6 is a diagrammatic view schematically illustrating a connection topology between processing systems across a plurality of blades.

FIG. 6 schematically illustrates connection topologies between processing systems 700 spanning a plurality of blades 600. Particularly, FIG. 6 illustrates an example in a case in which four blades 600a, 600b, 600c and 600d are connected to each other. The four processing systems 700 in each blade 600 are connected to each other by a point-to-point connection similarly as in the case illustrated in FIG. 5C.

The four blades 600a, 600b, 600c and 600d are connected to each other through the input/output bridge 722 provided in one of the processing systems 700 in each of the blades 600a, 600b, 600c and 600d such that they can carry out one-to-one communication therebetween. For example, the blade 600a and the blade 600d carry out point-to-point connection therebetween through the input/output bridge 722 of the processing system 700d in the blade 600a and the input/output bridge 722 of the processing system 700m in the blade 600d. Although the processing system 700d connects also to the processing systems 700a, 700b and 700c in the blade 600a, since the input/output bridge 722 includes the four input/output ports 730, 731, 732 and 733, the processing system 700d can connect to four different processing systems 700 at the same time.

When 16 processing systems 700a to 700p are connected in the configuration depicted in FIG. 6, the hop number of arbitrary different processing systems 700 is at most three, namely, the number of processing systems 700 intervening to reach the other party, is at most three. Consequently, the latency upon data transfer where data are shared in a case in which the 16 processing systems 700a to 700p cooperate to execute one game application can be suppressed.

Generally, when a plurality of GPUs are caused to cooperatively operate, a rendering process of the GPUs is divided into frame units or region units, and individual rendering tasks are distributed to the plurality of GPUs. In the mainstream, the plural distributed rendering tasks are processed by the individual GPUs, and results of the rendering are written back into one of the GPUs. This is because there is a restriction to transmission of a rendering result between GPUs.

For example, if a dedicated bus is used for transmission of a rendering result, then since the dedicated bus is like a display interface optimized for transmission of an image, the bandwidth is guaranteed. However, the bandwidth is limited to a band necessary to transmit an image of a resolution equal to or lower than a certain resolution. On the other hand, PCI Express is sometimes used for transmission of a rendering result. In this instance, although the bandwidth is great and no dedicated interface is required, since the transmission of a rendering result is mixed with transmission of other data, the bandwidth guarantee is difficult.

GPUs in recent years have become able to not only carry out graphics rendering but also carry out, in place of CPUs, parallel processing of part of physical calculation or of a simulation which has been carried out by a CPU in the past. Therefore, in a real time application of a game or the like, it has become possible to divide physical calculation or the like into processes suitable for a CPU and a GPU, execute the processes in parallel and then reflect a result of the execution of the processes on a rendering process. However, for example, when an input by a user is to be reflected on physical calculation and rendering, distributed processing in a unit of a frame is not suitable because this makes a cause to increase the latency.

Further, where physical calculation and rendering are to be completed in one frame, an interaction of a CPU and a GPU occurs by a plural number of times within one frame. For example, a case is considered wherein one frame is divided into two regions in each of the vertical and horizontal directions and the totaling four regions are rendered by four GPUs. At this time, a shadow of a moving body existing in a region to be processed by a certain GPU can sometimes reflect not only in the region but also in another region to be processed by a different GPU. In this case, a movement of the moving body is processed by a CPU while the shadow originating from the moving body is rendered by the two GPUs. Thus, interaction of the CPU and the GPUs occurs by a plural number of times within one frame.

The processing system 700 in the embodiment is a system in which the CPU 710 and the GPU 724 are integrated on one chip. Further, the CPU 710 and the GPU 724 share the memory 726. Therefore, when the CPU 710 and the GPU 724 refer to the common data, no memory copy occurs, and the latency becomes short. Further, since the DMA controller 716 is connected to the GPU bus 718 and can execute data transfer under the control of the GPU 724, also when the processing system 700 carries out distributed processing together with a different processing system 700 connected thereto through the input/output port 732, the latency by communication and synchronization can be suppressed. Consequently, distributed processing on the real time basis wherein data is transferred between different GPUs 724 or CPUs 710 by a plural number of times within one frame can be implemented.

Figure 7:
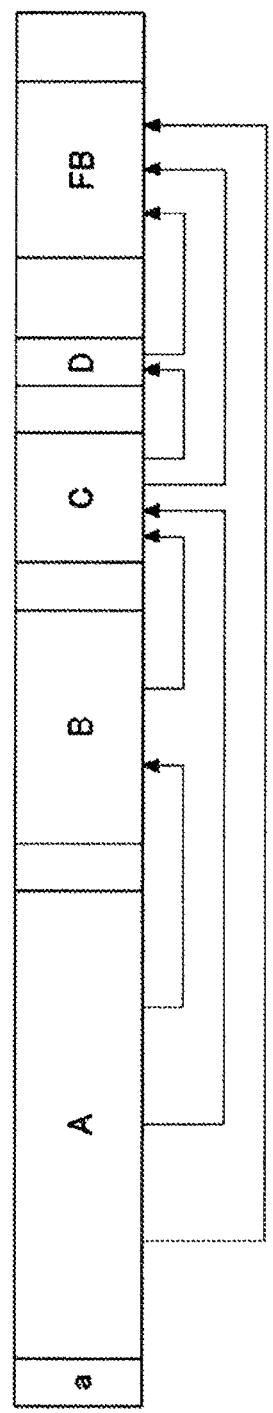
FIG. 7 is a diagrammatic view illustrating a memory map of a memory and a dependency of processes upon cooperation of four processing systems.

FIG. 7 illustrates a dependency between a memory map of the memory 726 and processing when the four processing systems 700a, 700b, 700c and 700d cooperate with each other. Referring to FIG. 7, reference character "a" indicates that the memory map is that of the memory 726 of the processing system 700a. A memory region indicated by reference character A (hereinafter referred to as "region A") indicates a region into which data read out from a storage not depicted is to be stored by the CPU 710 of the processing system 700a.

A memory region denoted by reference character B (hereinafter referred to as "region B") is a memory region into which a result of an arithmetic operation process executed by the GPU 724 using the data in the region A is stored. A region denoted by reference character C (hereinafter referred to as "region C") is a memory region into which a result of an arithmetic operation process executed by the GPU 724 using both of the data in the region A and data in the region B is stored. A region denoted by reference character D (hereinafter referred to as "region D") is a memory region into which, after data in the region C are fully prepared, a result of an arithmetic operation process executed by the CPU 710 using the data in the region C is stored. The region denoted by reference character FB (hereinafter referred to as "region FB") is a frame buffer into which a result of rendering executed using the data in the region A, data in the region C and data in the region D is stored.

FIGS. 8A to 8E illustrate an example of a flow of updating of a memory map when the four processing systems 700a, 700b, 700c and 700d cooperate with each other.

Referring to FIGS. 8A to 8E, reference characters "a," "b," "c" and "d" indicate memory maps of the memories 726 of the processing systems 700a, 700b, 700c and 700d. The memory regions denoted by reference characters "A," "B," "C" and "D" are similar to those described hereinabove.

FIGS. 8A to 8E illustrate an example wherein results of distributed processing by the four processing systems 700a, 700b, 700c and 700d are collected into the processing system 700d. A game program and data used for execution of distribution processing are stored in a shared storage (not depicted) which can be accessed from all processing systems 700. Although the program is read out from the shared storage and executed by the individual processing systems 700, after the huge data are read out by the processing system 700d, they are broadcasted from the processing system 700d to all of the other processing systems 700 through the input/output bridge 722d. For the shared data, the region A assured in advance is used in order that all processing systems 700 share the data at the same address.

Figures 8A, 8B, 8C, 8D, 8E:
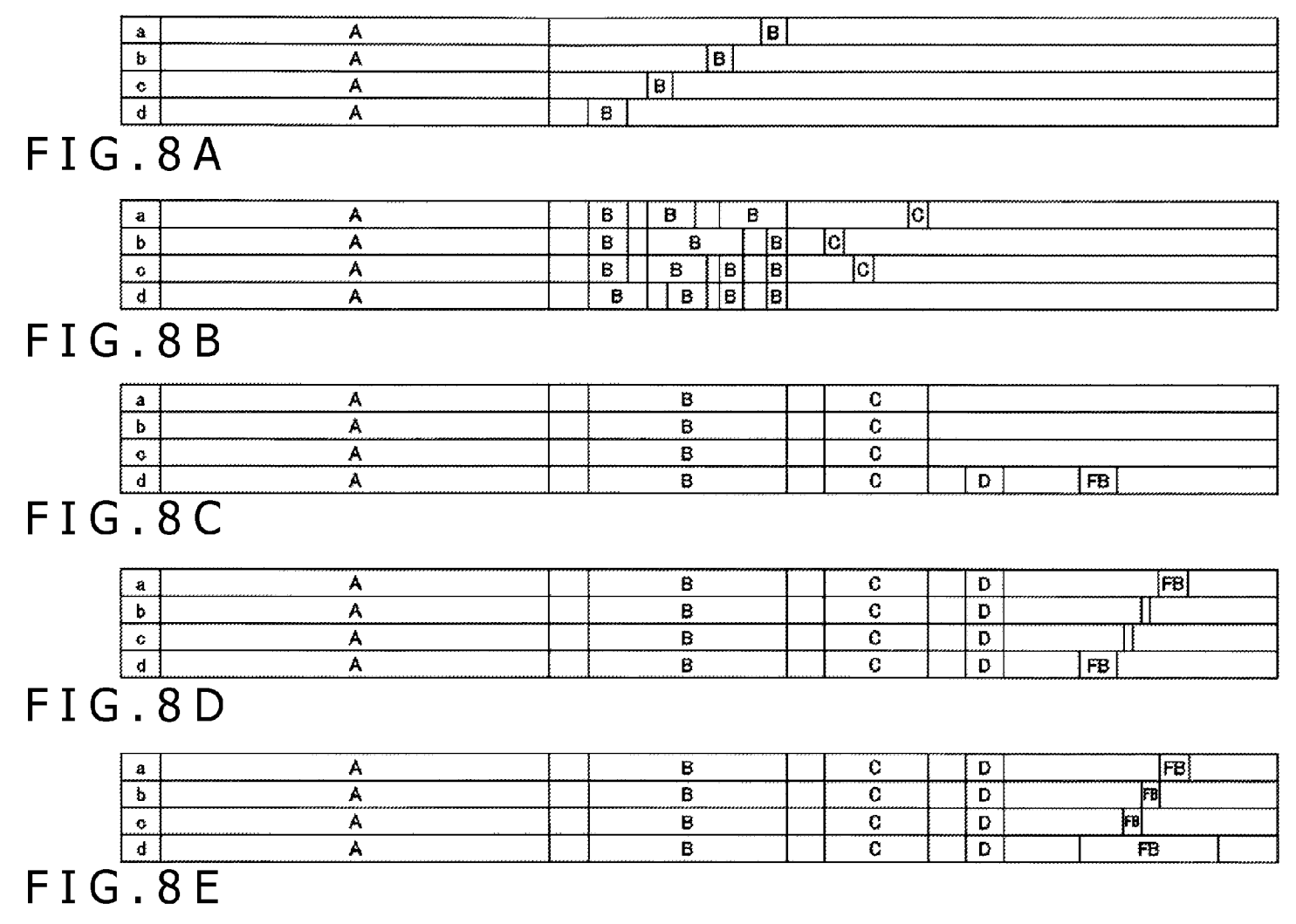

The processing system 700d reads out all data necessary for execution of a program such as textures and primitives from the shared storage. The processing system 700d stores the read out data into the region A. The processing system 700d continues reading out of data from the shared storage and broadcasts contents in the region A as non-compressed data of a low priority to the other processing systems 700a, 700b and 700c. Consequently, the processing systems 700a, 700b, 700c and 700d store the common data into the individual regions A as depicted in FIG. 8A.

After the four processing systems 700a, 700b, 700c and 700d store the common data into the individual regions A, the CPU 710 of the processing system 700d writes a message for conveying starting of program execution in a high priority into the other processing systems 700a, 700b and 700c. In the processing systems 700a, 700b and 700c, a task to be executed by the GPU 724 is being executed already, and each GPU 724 is polling a message region (not depicted).

After each GPU 724 detects the message, it uses the data stored in the region A in the memory 726 to output the result into the region B in the corresponding memory 726. FIG. 8A illustrates that the result of the arithmetic operation is stored in the region B in each of the four processing systems 700a, 700b, 700c and 700d.

At a point of time at which each GPU 724 outputs its arithmetic operation result to the region B, a next command is placed already in the GPU 724. The next command placed in the GPU 724 is an instruction for broadcasting the contents in the region B into the region B in the memory 726 in the other processing systems 700. Each DMA controller 716 broadcasts the contents in the region B to the other processing systems 700 in accordance with a DMA instruction issued by the GPU 724. Consequently, each processing system 700 can share the data in the region B processed by the processing system 700 itself with the other processing systems 700. FIG. 8B illustrates a result when data which have not been processed as yet at a point of time after each processing system 700 shares the data in the region B are further processed.

Here, the DMA controller 716 in the present embodiment executes compression of the data stored in the memory 726, decompression of data received by the input/output bridge 722 from data transferred from the external processing system 700 and control of the priority ranking of an instruction issued from the GPU 724 or the CPU 710. More particularly, when a compression option is set to the received writing instruction, the DMA controller 716 transfers the data read out from the memory 726 to a compression engine not depicted. In order to hide the latency occurred in the compression engine, the DMA controller 716 processes requests inputted to the other command interfaces in parallel.

When the DMA controller 716 receives compressed data from the input/output bridge 722, it transfers the received data to a decompression engine not depicted. The decompression engine writes the data after decompression into the memory 726. When the destination of a reading-in/writing instruction received from the input/output bridge 722 is a local node, the DMA controller 716 passes the command to the GPU bus 718. If the destination is not a local node, then the DMA controller 716 processes the instruction as an error or carries out routing to an input/output node connected to the destination node.

In this manner, by compressing data upon data transfer between different ones of the processing systems 700, the transfer efficiency can be raised.

Referring back to FIGS. 8A to 8E, as described hereinabove, the region C is a memory region into which a result when the GPU 724 carries out arithmetic operation processing using both of the data in the region A and the data in the region B is to be stored. A GPU task for generating data to be stored into the region C polls the data stored in the region B and waits until data necessary for the arithmetic operation are prepared. FIG. 8B illustrates that, since the data to be used for generation of data to be stored into the region C are prepared, data for the region C are generated and stored in each of the processing systems 700. FIG. 8C illustrates a case in which the data in the region C generated in the processing systems 700 are broadcasted to each other and consequently all processing systems 700 share the data in the region C.

Here, data to be written into the region B from another processing system 700 is written from the DMA controller 716 through the GPU bus 718. On the other hand, data to be written into the region C is written through the CPU bus 720. Alternatively, also where data is to be written into the other processing systems 700, an instruction may be issued to the DMA controller 716 so that data is written into the memory through the CPU bus 720.

If a writing completion interruption into the region C is received, then the CPU 710 of the processing system 700*d* generates data to be stored into the region D using the data in the region C as depicted in FIG. 8C. It is to be noted that, since the writing into the region C is carried out through the CPU bus 720, also when the CPU 710 caches the contents in the region C, the contents of the cache are updated by writing from the outside. After the data are stored into the region D, the CPU 710 of the processing system 700*d* broadcasts the data to the other processing systems 700. FIG. 8D illustrates the data in the region D shared by all of the processing systems 700.

The rendering task to be processed by the GPU 724 in all of the processing systems 700 polls completion of writing into the region C and the region D, and at a point of time at which the data are prepared, a frame generation process is started. Results of rendering by the GPUs 724 are written into the respective regions FB. FIG. 8D illustrates the rendering results of the GPUs 724 written in the respective regions FB. The rendering results of the GPUs 724 are broadcasted into the region FB of the processing system 700*d* and are copied into the region FB of the processing system 700*d* as depicted in FIG. 8E. If the data in the region FB are prepared, then the processing system 700*d* executes display outputting.

In this manner, the blade server 200 in the embodiment includes a plurality of processing systems 700 each of which can solely execute at most one game application such that the plural processing systems 700 can cooperate with each other to execute one game application. Thereupon, the GPUs 724 in the processing systems 700 can closely transfer not only a final result of processing but also intermediate data to each other. Consequently, a process of a greater amount of arithmetic operation than where a game application is executed by one processing system 700 can be executed, and a more accurate and higher-definition image can be provided.

It is assumed that, where PCE Express 4.0 (Gen4: 4th generation) is adopted for the input/output bridge 722, 16 lanes are divided into four ports to establish a four [lanes/port] scheme. At this time, the bandwidth per one port is 8 GB/second, and the effective bandwidth is approximately 5 GB/second. The peak effective bandwidth where data are transferred simultaneously through four ports is approximately 20 GB/second for each of TX/RX. Where irreversible compression is combined, the internal bandwidth increases to several times the mentioned bandwidth value.

Here, the data amount which can be sent in one millisecond with the bandwidth of 5 Gb/second is 5 MB. If this is converted into vertex data of 32 bits, then the number of vertexes per one millisecond is 1.25 million. Therefore, where texture data of 32 bits/pixel are compressed to approximately ⅒, data of 50 MB per one millisecond, namely, data of 12.5 textures of an image of 1024 pixels in the vertical direction and 1024 pixels in the horizontal direction, can be transferred.

As described above, with the blade server 200 in the embodiment, the processing systems 700 are connected to each other by point-to-point connection, and it is possible to guarantee the bandwidth as a whole system by priority control of processing instructions in the DMA controller 716 and bandwidth guarantee by the GPU bus 718 which is an internal bus. For example, by each GPU 724 which processes real time data of a determined size while huge data read out from a file system are copied on the background, the deletion of a process which is to be completed in one frame can be suppressed.

In each processing system 700, from the reason that the CPU 710 and the GPU 724 can carry out memory copying through the DMA controller 716 and so forth, the latency in data transfer between the processing systems 700 can be reduced. Consequently, although distributed processing which includes mixed processes by the CPU 710 and the GPU 724 while data are transferred by a plural number of times within one frame is difficult in the past, such distributed processing becomes possible.

Execution of one game application through cooperation of a plurality of processing systems 700 has been described above. Now, an allocation process of the processing system which allocates execution of one game application is described.

In a cloud gaming system, where a game of high quality and a high load is provided, it is difficult to operate a plurality of games by one processing system. Therefore, a plurality of blade servers 200 each including a plurality of processing systems 700 like the application providing system 10 depicted in FIG. 1 are further prepared. However, if the processing systems 700 are prepared so as to be able to cope with operation upon time of a peak at which the load applied to the system is highest, then depending upon the time zone, the load decreases and such processing systems 700 that do not operate increase. Where the application providing system 10 is operated as a game providing system, it is necessary to suppress the latency low, and it is difficult to implement load dispersion in a plurality of regions in which time bands are different from each other.

Therefore, the allocation server 100 in the embodiment sets the number of processing systems 700 to be allocated in order to execute one game application based on the load to the blade server 200 serving as a game providing server. More particularly, when the load to the blade server 200 is high, the allocation server 100 sets the number of processing systems 700 to be allocated in order to execute one game application to a lower value than where the load to the blade server 200 is low.

On the other hand, when the load to the blade server 200 is low, the allocation server 100 may set the operation clock to the GPU 724 and the CPU 710 in the processing system 700 allocated in order to execute the game application to a high value in comparison with that in the case in which the load to the blade server 200 is high. The allocation server 100 changes over the operation state of the processing system 700, for example, in the following manner in response to the load to the blade server 200.
State 0: standby
State 1: one processing system 700 is used with an ordinary clock
State 2: one processing systems 700 is used with a higher speed clock
State 3: four processing systems 700 are used with a still higher speed clock
State 4: 16 processing systems 700 are used with a yet higher speed clock The allocation server 100 sets the operation state of the processing system 700 to the state 4 when the load to the blade server 200 is low and changes the operation state of the processing system 700 to the state 3, to the state 2 and to the state 1 as the load increases. Consequently, when the load to the blade server 200 is low, a game can be provided with an accurate high-definition image on the client apparatus 500. Even if the load to the blade server 200 increases, the game can be provided on the client apparatus 500 while picture quality equivalent to that where the game application is executed on a game console which is hardware for exclusive use is maintained. It is to be noted that the states described above are a mere example, and also it is possible to define states of different combinations of the processing systems 700 and clocks.

Here, the "load to the blade server 200" is an allocation index of the processing systems 700 which is utilized in order for the allocation server 100 to determine the number of processing systems 700 by which one game application is to be executed. In particular, the load to the blade server 200 is at least one of power consumption of the blade server 200, the heat generation amount of the blade server 200 and the number of client apparatus 500 or of users to which the blade server 200 is providing the game application. The power consumption or the heat generation amount of the blade server 200 can be acquired using a power meter or a temperature sensor not depicted. When the power consumption of the blade server 200 is high, when the amount of exhaust heat is great or when the number of client apparatus 500 or users to which the game application is being provided is great, the allocation server 100 decides that the load to the blade server 200 is high in comparison with that in any other case.

If, while the allocation server 100 sets the operation state of the processing system 700 to a certain state, for example, a user ends the game or changes over the application to another application which provides a lower load, then the load to the blade server 200 may possibly vary. Therefore, if the load to the blade server 200 increases or decreases while the allocation server 100 is providing a game application to a plurality of client apparatus 500, then the change of the scene in the game application whose provision is continuing may trigger the allocation server 100 to change the number of processing systems 700 to be allocated in order to execute the game application.

Here, the "change of the scene in the game application" signifies a timing at which a whole frame is rendered again, for example, by changeover of the stage by progress of the game or by change of the position of the virtual point of view for configuring a video of the game. If the allocation server 100 changes the operation state of the processing systems 700, then also the picture quality of a game application to be provided is changed. However, by changing the operation state upon changeover of the scene, it becomes possible to effectively utilize resources of the application providing system 10 while an uncomfortable feeling which the user may have upon change of the picture quality is suppressed.

As described hereinabove, even where a game application is provided in the state 1 in which one processing system 700 is used with an ordinary clock, picture quality equivalent to that where the game application is executed on a game console which is hardware for exclusive use can be provided to the client apparatus 500. Accordingly, where a game application is provided in any other operation state, the game application can be provided with higher picture quality than where the game application is executed on a game console which is hardware for exclusive use.

Therefore, where a plurality of processing systems 700 are allocated in order to execute a game application being provided to the client apparatus 500, the allocation server 100 may notify the client apparatus 500 that the game application is being provided with high quality. This can be carried out, for example, by displaying, at a portion of a video provided to the client apparatus 500, a message indicative of "high picture quality mode" or by conveying the message by voice upon starting of the provision of the game. Consequently, a user can recognize that the game is being played with higher picture quality than where the game is executed on a game console at home. Therefore, this can make an incentive to utilize the application providing system 10.

Figure 9:
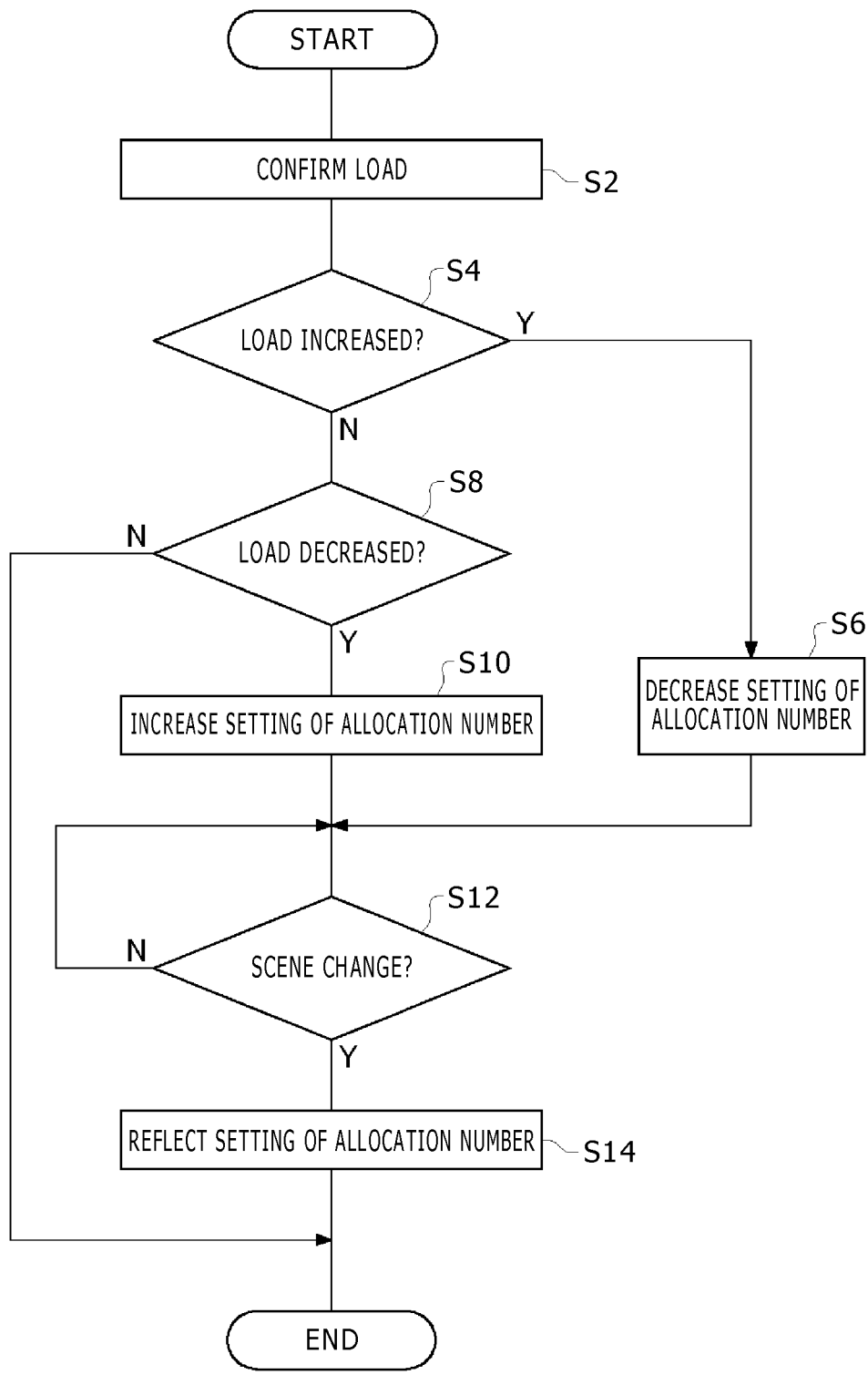
FIG. 9 is a flow chart illustrating a flow of a changing process of the allocation number of processing systems executed by an allocation server in the embodiment.

FIG. 9 is a flow chart illustrating a flow of a changing process of an allocation number of processing systems 700 which is executed by the allocation server 100 in the present embodiment.

The allocation server 100 confirms the load to the blade server 200 in the application providing system 10 (S2). If the load to the blade server 200 indicates an increase (Y at S4), then the allocation server 100 decreases the setting of the allocation number of processing systems 700 to be allocated for execution of one game application (S6).

If the load to the blade server 200 does not indicate an increase (N at S4) but indicates a decrease (Y at S8), then the allocation server 100 increases the setting of the allocation number of processing systems 700 to be allocated for execution of the one game software (S10). After the allocation server 100 changes the setting of the allocation number of processing system 700, if the game application being executed indicates a scene change (Y at S12), then the allocation server 100 causes the setting of the allocation number to be reflected (S14). On the other hand, while the game application being executed does not indicate a scene change (N at S12), the allocation server 100 waits the reflection of the setting of the allocation number until a scene change is found.

After the allocation server 100 carries out reflection of the setting of the allocation number or when the load to the blade server 200 exhibits no increase and no decrease (N at S8), the processing of the present flow chart is ended.

As described above, with the allocation server 100 according to the embodiment, the resources of the application providing system 10 can be allocated adaptively in response to the load to the blade server 200 which is a game providing server.

The present technology has been described above in connection with the embodiment thereof. The embodiment is illustrative, and it can be recognized by those skilled in the art that various modifications to the embodiment can be made in terms of combinations of the components and the processes of the embodiment and that such modifications are included in the scope of the present technology.

[Modifications]

In the foregoing description, the case is explained in which the allocation server 100 changes the allocation number of processing systems 700 to be allocated for execution of one game application or the allocation server 100 changes the operation clock of the processing systems 700 in response to the load to the blade server 200. However, the allocation server 100 may change the allocation number or the clock number in response to the client apparatus 500 which provides a game application in place of or in addition to the load to the blade server 200.

For example, a case is considered wherein, where a user tries user registration into the application providing system 10 in order to utilize the application providing system 10 according to the embodiment, the user pays a charge in response to a utilization form of the application providing system 10. For example, the user can register the user itself as a "premium user" to whom a processing system 700 is allocated more preferentially than to an ordinary user by paying a higher charge. Where a user who utilizes a certain client apparatus 500 is a premium user, even when the load to the blade server 200 is high, when a game application is to be provided to the client apparatus 500, the allocation server 100 allocates the state 2 or a higher operation state to the client apparatus 500. Consequently, to a specific user, a game application can always be provided with higher picture quality than where the game application is executed on a game console which is hardware for exclusive use.

It is to be noted that the technology according to the embodiment may be specified by items described below.

[Item 1-1]

A processing system, including:

a graphics processing unit configured to generate a video;

a memory configured to store data;

a data bus configured to connect the graphics processing unit and the memory to each other;

a direct memory access controller connected to the data bus;

an input/output bridge connected to the data bus and connected to an external bus for transferring data to and from an external processing system which cooperates with the processing system; and a central processing unit configured to cooperate with the graphics processing unit to share the data stored in the memory, the graphics processing unit issuing a data transfer instruction of the data stored in the memory to the direct memory access controller without intervention of the central processing unit, the direct memory access controller controlling, when the data transfer instruction is received, the input/output bridge to transfer the data stored in the memory to the external processing system.

[Item 1-2]

The processing system according to item 1-1, wherein the graphics processing unit issues a data acquisition instruction to the direct memory access controller without intervention of the central processing unit, the direct memory access controller issues, when the data acquisition instruction is received, a readout instruction of the data to the input/output bridge, the input/output bridge broadcasts the readout instruction of the data issued by the direct memory access controller to the external bus and receives data transferred from the external processing system responding to the readout instruction, and the direct memory access controller writes the data received by the input/output bridge into the memory.

[Item 1-3]

The processing system according to item 1-2, wherein the direct memory access controller executes control of compression of the data stored in the memory and decompression of data received by the input/output bridge from data transferred from the external processing system.

[Item 1-4]

A multiprocessing system which includes two or more processing systems according to item 1-1, wherein the input/output bridge in each of the processing systems has two or more input/output ports configured to transfer data to and from a different one of the processing systems, and the processing systems are connected for one-to-one communication to each other through the input/output ports which the input/output bridges of the game processing systems have.

[Item 1-5]

The multiprocessing system according to item 1-4, wherein, after the graphics processing unit or the central processing unit in each of the processing systems processes and stores data into the memory, the graphics processing unit or the central processing unit which has processed the data issues a data transfer instruction to the direct memory access controller, and the direct memory access controller which acquires the data transfer instruction broadcasts the data stored in the memory to the processing systems through the input/output bridge.

[Item 1-6]

The multiprocessing system according to item 1-4, wherein the multiprocessing system further includes a plurality of blades in each of which a plurality of processing systems according to item 1-1 are disposed on a same board, the plural game processing systems on each of the blades are connected for one-to-one communication through the input/output ports which the input/output bridges have, and the plurality of blades are connected for one-to-one communication with the input/output ports of the input/output bridge which one of the game processing systems in each of the blades includes.

[Item 2-1]

A game providing system, including:

an allocation server connected to a plurality of client apparatus through a network; and a game providing server configured to execute a game application to be provided to the client apparatus allocated by the allocation server, the game providing server being a multiprocessing system which includes a plurality of game processing systems each of which can solely execute at most one game application, the allocation server setting the number of ones of the game processing systems which are to be allocated in order to execute one game application in the game providing server in response to a load to the game providing server.

[Item 2-2]

The game providing system according to item 2-1, wherein the allocation server sets the number of the game processing systems to be allocated in order to execute one game application in the game providing server such that, where the load to the game providing server is high, the number is set smaller than where the load to the game providing server is low.

[Item 2-3]

The game providing system according to item 2-1, wherein each of the game processing systems of the game providing server includes a graphics processing unit configured to generate a video of the game application, a memory configured to store the data generated by the graphics processing unit, a central processing unit configured to cooperate with the graphics processing unit to share the data stored in the memory, and a direct memory access controller configured to transfer data stored in the memory to a different one of the game processing systems and receive data from a different one of the game processing systems, and the allocation server sets an operation clock for the graphics processing unit and the central processing unit such that, where the load to the game providing server is low, the operation clock is set higher than where the load to the game providing server is high.

[Item 2-4]

The game providing system according to item 2-1, wherein the load to the game providing server is at least one of power consumption of the game providing server, the amount of exhaust heat of the game providing server and the number of the client apparatus to which the game providing server is providing a game application.

[Item 2-5]

The game providing system according to item 2-1, wherein, when the load to the game providing server increases or decreases while a game application is being provided to a plurality of client apparatus, a change of a scene in the game application whose provision is continuing triggers the allocation server to increase or decrease the number of the game processing systems to be allocated in order to execute the game application.

[Item 2-6]

The game providing system according to item 2-1, wherein, where a plurality of game processing systems are allocated in order to execute a game application being provided to a client apparatus, the allocation server notifies the client apparatus that the game application is being provided with high quality.

The present disclosure contains subject matter related to that disclosed in Japanese Priority Patent Application JP 2014-075604 filed in the Japan Patent Office on Apr. 1, 2014, the entire content of which is hereby incorporated by reference.

What is claimed is:

1. A game providing system, comprising:
   an allocation server connected to a plurality of client apparatus through a network; and
   a game providing server configured to execute a game application to be provided to the client apparatus allocated by the allocation server,
   the game providing server being a multiprocessing system which includes a plurality of game processing systems each of which can solely execute at most one game application,
   the allocation server setting the number of ones of the game processing systems which are to be allocated in order to execute one game application in the game providing server in response to a load to the game providing server; wherein
   where the load to the game providing server decreases, the number of game processing systems allocated to execute one game application in the game providing server increases.

2. The game providing system according to claim 1, wherein where the load to the game providing server increases, the number of game processing systems allocated to execute one game application in the game providing server decreases.

3. The game providing system according to claim 1, wherein each of the game processing systems of the game providing server includes
   a graphics processing unit configured to generate a video of the game application,
   a memory configured to store the data generated by the graphics processing unit,
   a central processing unit configured to cooperate with the graphics processing unit to share the data stored in the memory, and
   a direct memory access controller configured to transfer data stored in the memory to a different one of the game processing systems and receive data from a different one of the game processing systems, and
   the allocation server sets an operation clock for the graphics processing unit and the central processing unit such that, where the load to the game providing server is low, the operation clock is set higher than where the load to the game providing server is high.

4. The game providing system according to claim 1, wherein the load to the game providing server is at least one of power consumption of the game providing server, the amount of exhaust heat of the game providing server and the number of the client apparatus to which the game providing server is providing a game application.

5. The game providing system according to claim 1, wherein, when the load to the game providing server increases or decreases while a game application is being provided to a plurality of client apparatus, a change of a scene in the game application whose provision is continuing triggers the allocation server to increase or decrease the number of the game processing systems to be allocated in order to execute the game application.

6. The game providing system according to claim 1, wherein, where the number of game processing systems allocated to execute a game application being provided to a client apparatus is increased in response to the decrease in load, the allocation server notifies the client apparatus that the game application is being provided to the client apparatus with high quality.

7. A game providing system, comprising:
an allocation server connected to a plurality of client apparatus through a network; and
a game providing server configured to execute a game application to be provided to the client apparatus allocated by the allocation server,
the game providing server being a multiprocessing system which includes a plurality of game processing systems each of which can solely execute at most one game application,
the allocation server setting the number of ones of the game processing systems which are to be allocated in order to execute one game application in the game providing server in response to a load to the game providing server; wherein
each of the game processing systems of the game providing server includes
a graphics processing unit configured to generate a video of the game application,
a memory configured to store the data generated by the graphics processing unit,
a central processing unit configured to cooperate with the graphics processing unit to share the data stored in the memory, and
a direct memory access controller configured to transfer data stored in the memory to a different one of the game processing systems and receive data from a different one of the game processing systems, and
the allocation server sets an operation clock for the graphics processing unit and the central processing unit such that, where the load to the game providing server is low, the operation clock is set higher than where the load to the game providing server is high.

8. The game providing system according to claim 7, wherein the allocation server sets the number of the game processing systems to be allocated in order to execute one game application in the game providing server such that, where the load to the game providing server is high, the number is set smaller than where the load to the game providing server is low.

9. The game providing system according to claim 7, wherein the load to the game providing server is at least one of power consumption of the game providing server, the amount of exhaust heat of the game providing server and the number of the client apparatus to which the game providing server is providing a game application.

10. The game providing system according to claim 7, wherein, when the load to the game providing server increases or decreases while a game application is being provided to a plurality of client apparatus, a change of a scene in the game application whose provision is continuing triggers the allocation server to increase or decrease the number of the game processing systems to be allocated in order to execute the game application.

11. The game providing system according to claim 7, wherein, where a plurality of game processing systems are allocated in order to execute a game application being provided to a client apparatus, the allocation server notifies the client apparatus that the game application is being provided with high quality.

\* \* \* \* \*